United States Patent
Yasumatsu et al.

(10) Patent No.: US 10,474,021 B2
(45) Date of Patent: Nov. 12, 2019

(54) ILLUMINATOR AND PROJECTOR

(71) Applicant: SEIKO EPSON CORPORATION, Tokyo (JP)

(72) Inventors: Wataru Yasumatsu, Azumino (JP); Takashi Endo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 71 days.

(21) Appl. No.: 15/705,647

(22) Filed: Sep. 15, 2017

(65) Prior Publication Data

US 2018/0088453 A1 Mar. 29, 2018

(30) Foreign Application Priority Data

Sep. 27, 2016 (JP) ................. 2016-187790

(51) Int. Cl.
  *G03B 21/20* (2006.01)
  *G02B 27/14* (2006.01)
  *G03B 33/12* (2006.01)

(52) U.S. Cl.
  CPC ....... *G03B 21/2073* (2013.01); *G02B 27/141* (2013.01); *G03B 21/204* (2013.01); *G03B 21/208* (2013.01); *G03B 21/2066* (2013.01); *G03B 33/12* (2013.01)

(58) Field of Classification Search
  CPC .... G03B 21/14; G03B 21/005; G03B 21/006; G03B 21/008; G03B 21/2073; G03B 21/204; G03B 21/206; G03B 21/2066; H04N 9/31; H04N 9/3102; H04N 9/3167
  USPC ......................................... 353/20
  See application file for complete search history.

(56) References Cited

U.S. PATENT DOCUMENTS

| | | | |
|---|---|---|---|
| 7,185,989 B2 * | 3/2007 | Fujita ................ | H04N 9/3105 353/121 |
| 2008/0143893 A1 * | 6/2008 | Nakagawa .......... | G02F 1/13363 349/8 |
| 2011/0043712 A1 | 2/2011 | Yamakawa | |

(Continued)

FOREIGN PATENT DOCUMENTS

| | | |
|---|---|---|
| EP | 2955552 A2 | 12/2015 |
| EP | 2955552 A3 | 6/2016 |

(Continued)

OTHER PUBLICATIONS

Feb. 15, 2018 Extended European Search Report issued in Patent Application No. EP 17193335.

*Primary Examiner* — William C. Dowling
(74) *Attorney, Agent, or Firm* — Oliff PLC

(57) ABSTRACT

An illuminator includes a light source apparatus that outputs first light that belongs to a first wavelength band, an optical element including a dichroic film and a first retardation element, a reflection element, a light dividing element including a plurality of lenses, and a polarization conversion element. A first component of the first light outputted from the light source apparatus passes through the dichroic film and the first retardation element in this order, is reflected off the reflection element, passes through the first retardation element, and is further reflected off the dichroic film. The first component reflected off the dichroic film passes through the light dividing element and is incident on the polarization conversion element.

14 Claims, 6 Drawing Sheets

(56) References Cited

U.S. PATENT DOCUMENTS

| | | | |
|---|---|---|---|
| 2012/0127435 A1* | 5/2012 | Kitano | G03B 21/204 |
| | | | 353/20 |
| 2013/0229628 A1 | 9/2013 | Akiyama et al. | |
| 2018/0275495 A1* | 9/2018 | Egawa | G03B 21/16 |
| 2019/0041738 A1* | 2/2019 | Kashiwagi | G03B 21/2073 |

FOREIGN PATENT DOCUMENTS

| | | |
|---|---|---|
| JP | 2005-195780 A | 7/2005 |
| JP | 2007-101820 A | 4/2007 |
| JP | 2012-108486 A | 6/2012 |
| JP | 2012-123179 A | 6/2012 |
| JP | 2013-182207 A | 9/2013 |
| JP | 2013-250494 A | 12/2013 |

* cited by examiner

ILLUMINATOR AND PROJECTOR

BACKGROUND

1. Technical Field

The present invention relates to an illuminator and a projector.

2. Related Art

In recent years, a projector uses a light source apparatus using fluorescence (see JP-A-2012-108486, for example). In the projector shown in the sixth embodiment, blue light reflected off a phosphor layer is reflected off a dichroic mirror toward a lens integrator, which divides the blue light into a plurality of narrow light beam fluxes. The plurality of narrow light beam fluxes are incident on a polarization conversion element. The polarization conversion element includes a plurality of polarization converters each including a polarization separation element, a reflection film, and a retardation element.

Since fluorescence emitted from the phosphor layer is non-polarized light, the fluorescence having exited out of the polarization conversion elements contains the components that travel along the optical paths of the light fluxes that are reflected off the polarization separation elements and the components that travel along the optical paths of the light fluxes that pass through the polarization separation elements with the two components having the same proportion. On the other hand, since the blue light is linearly polarized light, the blue light having exited out of the polarization conversion element contains only one of the light components that travel along the optical paths described above. The intensity distribution of the blue light projected on a screen therefore differs from the intensity distribution of the fluorescence projected on the screen, undesirably resulting in occurrence of color unevenness in an image projected on the screen.

SUMMARY

An advantage of some aspects of the invention is to provide an illuminator having a simple configuration and capable of reducing color unevenness. Another advantage of some aspects of the invention is to provide a projector including the illuminator and therefore capable of reducing color unevenness.

According to a first aspect of the invention, an illuminator is provided. The illuminator includes a light source apparatus that outputs first light that belongs to a first wavelength band, an optical element including a dichroic film having a function of separating polarized components of the first light from each other and a first retardation element and so configured that a first component of the first light outputted from the light source apparatus sequentially transmits the dichroic film and the first retardation element, a reflection element that reflects the first component having passed through the first retardation element in such a way that the first component passes through the first retardation element and is reflected off the dichroic film, a light dividing element provided in an optical path of the first component reflected off the dichroic film, the light dividing element including a plurality of lenses, and a polarization conversion element including a plurality of polarization converters each including a polarization separation element, a reflection film, and a second retardation element, the polarization conversion element so provided that a plurality of light beam fluxes produced by the light dividing element are incident on the corresponding polarization converters.

In the illuminator according to the first aspect of the invention, the first component having been reflected off the reflection element and having passed through the first retardation element is reflected off the dichroic film. The first component reflected off the dichroic film passes through the first retardation element again so that the first component is converted into circularly or elliptically polarized light. Therefore, since the circularly or elliptically polarized light is incident on the polarization converters, the first component having exited out of the polarization conversion element contains both the component having been reflected off the polarization separation elements and the component having passed through the polarization separation elements. The illuminator according to the first aspect of the invention can therefore output illumination light that is unlikely to produce color unevenness.

In the first aspect described above, it is preferable that the illuminator further includes a wavelength conversion element, that the first light further contains a second component to be converted by the wavelength conversion element into second light that belongs to a second wavelength band different from the first wavelength band, and that the wavelength conversion element is so configured that the second component passes through or is reflected off the dichroic film and is incident on the wavelength conversion element and the second light having exited out of the wavelength conversion element is reflected off or passes through the dichroic film and is incident on the light dividing element.

According to the configuration described above, the first light and the second light can be combined with each other to produce illumination light.

In the first aspect described above, it is preferable that the wavelength conversion element also serves as the reflection element.

According to the configuration described above, the number of parts can be reduced.

In the first aspect described above, it is preferable that the first component is incident on the first retardation element at an angle of incidence greater than 0°, and that an optic axis of the first retardation element is parallel to a surface of the first retardation element on which the first component is incident.

According to the configuration described above, the first retardation element can be readily manufactured.

In the first aspect described above, it is preferable that the first retardation element includes a transparent substrate and a retardation film provided on the transparent substrate, and that the retardation film is made of an inorganic material.

According to the configuration described above, a retardation element having a simple configuration but having high reliability can be provided because the retardation element includes the retardation film made of an inorganic material.

In the first aspect described above, it is preferable that the first retardation element is a birefringent substrate.

According to the configuration described above, an increase in the number of parts that form the optical element can be suppressed.

According to a second aspect of the invention, a projector is provided. The projector includes the illuminator according to the first aspect, a light modulator that modulates light from the illuminator in accordance with image information to form image light, and a projection system that projects the image light.

The projector according to the second embodiment, which includes the light source apparatus described above, can display an image with color unevenness reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
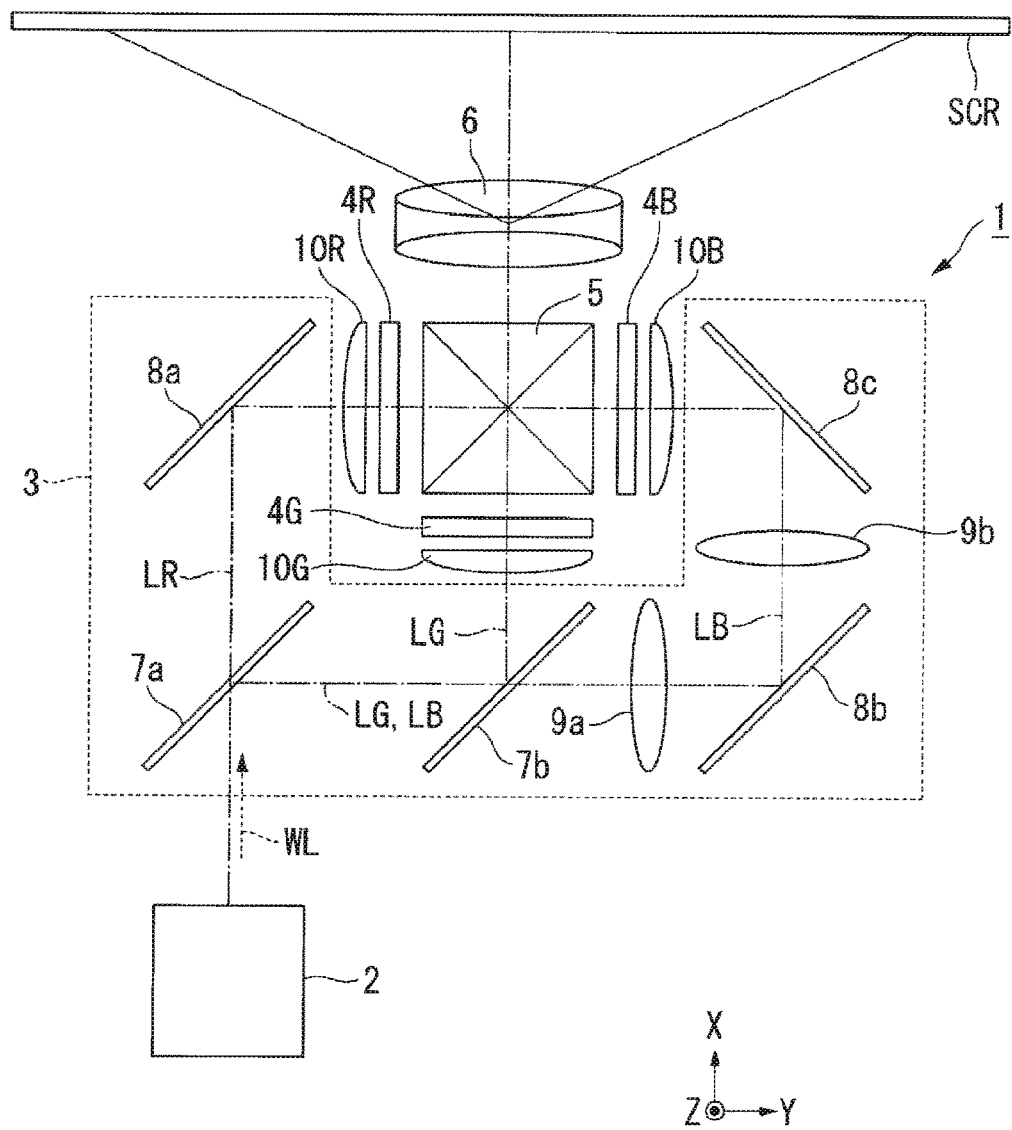
FIG. 1 shows a schematic configuration of a projector according to a first embodiment.

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

A schematic configuration of a projector according to the present embodiment will first be described.

FIG. 1 shows a schematic configuration of the projector according to the present embodiment.

A projector 1 according to the present embodiment is a projection-type image display apparatus that displays a color image on a screen SCR, as shown in FIG. 1. The projector 1 includes an illuminator 2, a color separation system 3, a light modulator 4R, a light modulator 4G, a light modulator 4B, a light combining system 5, and a projection system 6.

The color separation system 3 separates illumination light WL into red light LR, green light LG, and blue light LB. The color separation system 3 generally includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the illuminator 2 into the red light LR and the other light fluxes (green light LG and blue light LB). The first dichroic mirror 7a transmits the red light LR but reflects the other light fluxes (green light LG and blue light LB). On the other hand, the second dichroic mirror 7b reflects the green light LG but transmits the blue light LB to separate the other light fluxes into the green light LG and the blue light LB.

The first total reflection mirror 8a is disposed in the optical path of the red light LR and reflects the red light LR having passed through the first dichroic mirror 7a toward the light modulator 4R. On the other hand, the second total reflection mirror 8b and the third total reflection mirror 8c are disposed in the optical path of the blue light LB and guide the blue light LB having passed through the second dichroic mirror 7b to the light modulator 4B. The green light LG is reflected off the second dichroic mirror 7b toward the light modulator 4G.

The first relay lens 9a and the second relay lens 9b are disposed in the optical path of the blue light LB and in positions downstream of the second dichroic mirror 7b. The first relay lens 9a and the second relay lens 9b have the function of compensating optical loss of the blue light LB due to the fact that the optical path of the blue light LB is longer than the optical paths of the red light LR and the green light LG.

The light modulator 4R modulates the red light LR in accordance with image information to form red image light. The light modulator 4G modulates the green light LG in accordance with image information to form green image light. The light modulator 4B modulates the blue light LB in accordance with image information to form blue image light.

The light modulators 4R, 4G, and 4B are each formed, for example, of a transmissive liquid crystal panel. Polarizers (not shown) are disposed on the light incident side and the light exiting side of each of the liquid crystal panels.

Field lenses 10R, 10G, and 10B are disposed on the light incident side of the light modulators 4R, 4G, and 4B, respectively. The field lenses 10R, 10G, and 10B respectively parallelize the red light LR, the green light LG, and the blue light LB incident on the light modulators 4R, 4G, and 4B.

The light combining system 5 combines the image light fluxes from the light modulators 4R, 4G, and 4B with one another and directs the combined image light toward the projection system 6. The light combining system 5 is, for example, a cross dichroic prism.

The projection system 6, which is formed of a projection lens group, enlarges the combined image light from the light combining system 5, and projects the enlarged image light toward the screen SCR. An enlarged color image is thus displayed on the screen SCR.

Illuminator

The illuminator 2 according to an embodiment of the invention will subsequently be described.

Figure 2:
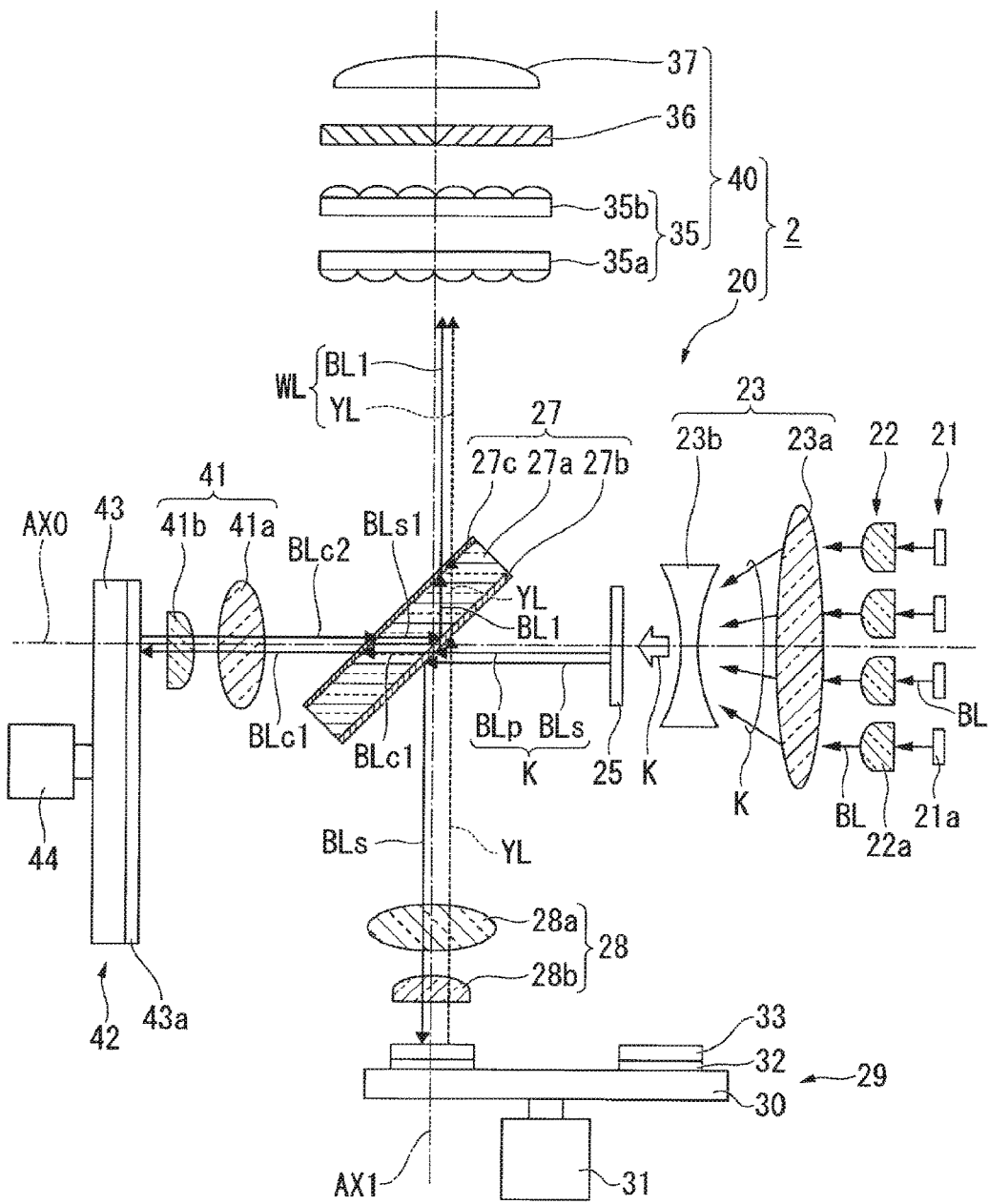
FIG. 2 shows the configuration of an illuminator.

FIG. 2 shows the configuration of the illuminator 2. The illuminator 2 includes a light source apparatus 20, an optical element 27, a first pickup system 28, a rotating fluorescent plate 29, a second pickup system 41, a rotating diffusive plate 42, and a uniform illumination system 40, as shown in FIG. 2.

The uniform illumination system 40 includes an optical integration system 35, a polarization conversion element 36, and a superimposing lens 37.

The light source apparatus 20 includes a light source unit 21, a collimator system 22, an afocal system 23, and a retardation film 25.

The light source apparatus 20, the optical element 27, the second pickup system 41, the rotating diffusive plate 42 are disposed along an optical axis AX0. The optical element 27, the first pickup system 28, and the rotating fluorescent plate 29 are disposed along an optical axis AX1, which is perpendicular to the optical axis AX0.

The optical unit 21 includes a plurality of semiconductor lasers 21a as a solid-state light source. The plurality of semiconductor lasers 21a are arranged in an array in a plane perpendicular to the optical axis AX0. The semiconductor lasers 21a each emit, for example, a blue light beam BL (laser beam having a peak wavelength of 445 nm, for example).

The collimator system 22 includes a plurality of collimator lenses 22a. The collimator lenses 22a are provided on the light exiting side of the corresponding semiconductor lasers 21a and convert the light beams from the corresponding semiconductor lasers 21a into parallelized light fluxes.

The afocal system 23 is formed, for example, of a convex lens 23a and a concave lens 23b. The afocal system 23 reduces the diameter of a light beam flux K (a plurality of light beams BL) outputted from the light source unit 21.

The retardation film 25 is, for example, a rotatable half-wave plate. The light beam flux K outputted from the light source unit 21 is linearly polarized light. The light having passed through the retardation film 25 set at an appropriate angle of rotation therefore contains an S-polarized component and a P-polarized component with respect to the optical element 27 at a predetermined ratio therebetween. In the present embodiment, on the basis of the configuration described above, rotating the retardation film 25 allows the ratio between the S-polarized component and the P-polarized component to be changed.

On the basis of the configuration described above, the light source apparatus 20 is configured to output the light beam flux K containing a P-polarized light beam BLp and an S-polarized light beam BLs toward the optical element 27. In the present embodiment, the light beam flux K corresponds to the "first light that belongs to a first wavelength band" in the appended claims.

The optical element 27 includes a first retardation element 27a, a dichroic film 27b, which is provided on a first surface of the first retardation element 27a, and an antireflection film 27c, which is provided on a second surface of the first retardation element 27a, which is the surface opposite the first surface. The light beam flux K outputted from the light source apparatus 20 is incident on the first surface.

In the present embodiment, the first surface of the first retardation element 27a is so disposed as to incline by 45° with respect to the optical axis AX0 and the optical axis AX1. That is, the angle of incidence of light incident on the first retardation element 27a is greater than 0°.

The first retardation element 27a is formed, for example, of a birefringent substrate. A birefringent material can be, for example, be quartz or sapphire. In the present embodiment, the first retardation element 27a is formed of a quartz substrate, for example, having a thickness of 0.5232 mm and having an optic axis parallel to the first surface. Using a quartz substrate having an optic axis parallel to the first surface allows the first retardation element 27a to be readily manufactured.

Appropriately adjusting the direction of the optical axis (hereinafter referred to as optical axis angle) of the first retardation element 27a allows adjustment of the polarization state of light that exits out of the optical element 27 toward the uniform illumination system 40. In the present embodiment, the optical axis angle of the first retardation element 27a is set at 42°, which will be described later.

Figure 4:
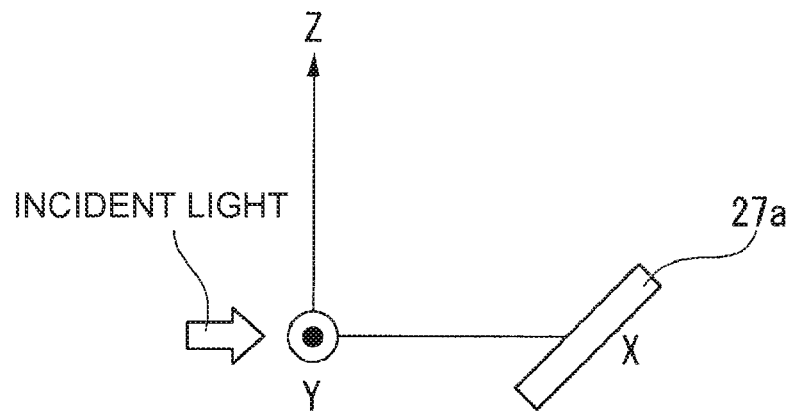
FIG. 4 describes how to measure an optical axis angle of a first retardation element.
Figure 5:
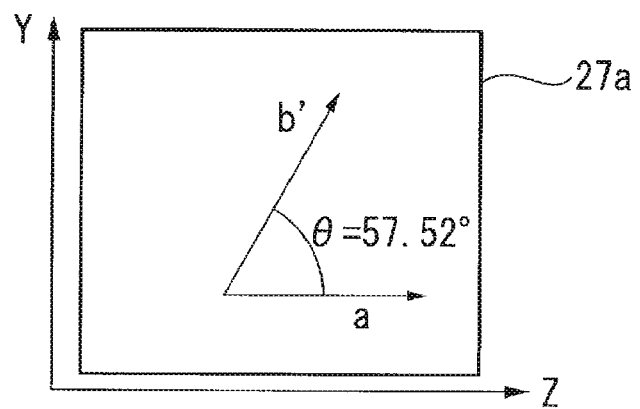
FIG. 5 describes how to measure the optical axis angle of the first retardation element.

How to measure the optical axis angle of the first retardation element 27a will be described with reference to the drawings. FIGS. 4 and 5 describe how to measure the optical axis angle of the first retardation element 27a. In FIGS. 4 and 5, the description will be made by using an XYZ coordinate system.

A plane perpendicular to the incident light will first be considered. In FIG. 4, assuming that an X-axis direction is the traveling direction of light incident on the first retardation element 27a, the YZ plane is a plane perpendicular to the incident light. The angle θ between an optic axis b' of the first retardation element 27a projected on the YZ plane and a polarization direction a of the incident light (Z direction) is set, for example, at 57.52°, as shown in FIG. 5.

In this case, in the plane of the first retardation element 27a, the angle formed by the plane including the traveling direction of the incident light and the polarization direction thereof (XZ plane), and the optic axis of the first retardation element 27a (optical axis angle) is 42°.

On the basis of the configuration described above, the polarization state of the light passing through the first retardation element 27a can be changed. The antireflection film 27c prevents interface reflection of the light from the rotating diffusive plate 42 to allow the light to be efficiently introduced into the optical element 27.

The dichroic film 27b has the function of separating the polarized components of the light beam flux K from each other. The dichroic film 27b reflects the S-polarized component of the light beam flux K but transmits the P-polarized component of the light beam flux K. The S-polarized component is reflected off the dichroic film 27b and directed toward the rotating fluorescent plate 29. The P-polarized component passes through the dichroic film 27b and travels toward the rotating diffusive plate 42.

Specifically, the S-polarized light beam BLs reflected off the dichroic film 27b enters the first pickup system 28. The first pickup system 28 is formed, for example, of a first pickup lens 28a and a second pickup lens 28b.

In the present embodiment, the light beam BLs corresponds to the "second component" in the appended claims.

The first pickup system 28 causes the light beam BLs to converge toward a phosphor layer 33 of the rotating fluorescent plate 29. The rotating fluorescent plate 29 includes a disc 30, the phosphor layer 33, which is formed in the form of a ring on the disk 30, a motor 31, which rotates the disk 30, and a reflection layer 32, which is provided between the phosphor layer 33 and the disc 30. The disc 30 is formed of a metal member that excels in heat dissipation.

The phosphor layer 33 contains phosphor particles that convert the light beam BLs, which serves as excitation light, into yellow fluorescence YL and emit the fluorescence YL. The phosphor particles can, for example, be a YAG-based (yttrium-aluminum-garnet-based) phosphor. The phosphor particles may be made of one type of material or two or more types of material.

In the present embodiment, the phosphor layer 33 corresponds to the "wavelength conversion element" in the appended claims, and the fluorescence YL corresponds to the "second light that belong to a second wavelength band" in the appended claims.

The reflection layer 32 reflects the fluorescence YL emitted from the phosphor layer 33 toward the disc 30 and directs the fluorescence YL toward the first pickup system 28. On the basis of the configuration described above, the fluorescence YL produced by the phosphor layer 33 exits out of the rotating fluorescent plate 29 toward the side opposite the disc 30.

The fluorescence YL is parallelized by the first pickup system 28 and then incident on the optical element 27. The fluorescence YL passes through the optical element 27 (dichroic film 27b, first retardation element 27a, and antireflection film 27c) and enters the uniform illumination system 40.

On the other hand, the P-polarized light beam BLp passes through the dichroic film 27b, the first retardation element 27a, and the antireflection film 27c in this order. In the present embodiment, the light beam BLp corresponds to the "first component of the first light" in the appended claims.

The light beam BLp, when passing through the first retardation element 27a, is converted into a circularly polarized light beam BLc1. In the following sections, the description will be made on the assumption that the light beam BLc1 is right-handed circularly polarized light. The light beam BLc1 enters the second pickup system 41. The second pickup system 41 is formed, for example, of a first pickup lens 41a and a second pickup lens 41b.

The second pickup system 41 causes the light beam BLc1 to converge toward the rotating diffusive plate 42. The rotating diffusive plate 42 diffuses the light beam BLc1 having exited out of the second pickup system 41 and reflects the diffused light beam BLc1 toward the optical element 27. The rotating diffusive plate 42 reflects the right-handed circularly polarized light beam BLc1 in the form of left-handed circularly polarized blue light BLc2.

The rotating diffusive plate 42 includes a diffusing reflective plate 43 and a motor 44 for rotating the diffusing reflective plate 43. The diffusing reflective plate 43 is formed, for example, by forming a diffusing structure 43a formed of irregularities on a surface of a light reflective member. The diffusing reflective plate 43 has, for example, a circular shape when viewed in the direction of the axis of rotation. In the present embodiment, the rotating diffusive plate 42 corresponds to the "reflection element" in the appended claims.

According to the present embodiment, since the light diffused and reflected by the rotating diffusive plate 42 is used as the blue light LB, the amount of speckle produced by the blue light LB, which is formed of a laser beam, can be reduced.

The left-handed circularly polarized blue light BLc2 reflected off the rotating diffusive plate 42 is incident on the optical element 27 again via the second pickup system 41. The blue light BLc2 passes through the antireflection film 27c and the first retardation element 27a in this order. The left-handed circularly polarized blue light BLc2, when passing through the first retardation element 27a, is converted into S-polarized blue light BLs1.

The S-polarized blue light BLs1 is reflected off the dichroic film 27b, passes through the first retardation element 27a, and exits as blue light BL1 out of the optical element 27 toward the uniform illumination system 40. The blue light BL1, when passing through the first retardation element 27a, is converted into right-handed circularly polarized light. The antireflection film 27c does not affect the polarization state of light that passes therethrough. That is, the blue light BL1 having exited out of the optical element 27 is right-handed circularly polarized light.

The blue light BL1 and the fluorescence YL are combined with each other to produce white illumination light WL, which enters the optical integration system 35.

The optical integration system 35 is formed, for example, of a lens array 35a and a lens array 35b. The lens arrays 35a and 35b are each formed of a plurality of lenslets arranged in an array. The optical integration system 35 divides the illumination light WL into a plurality of light beam fluxes. In the present embodiment, the optical integration system 35 corresponds to the "light dividing element" in the appended claims.

Figure 3:
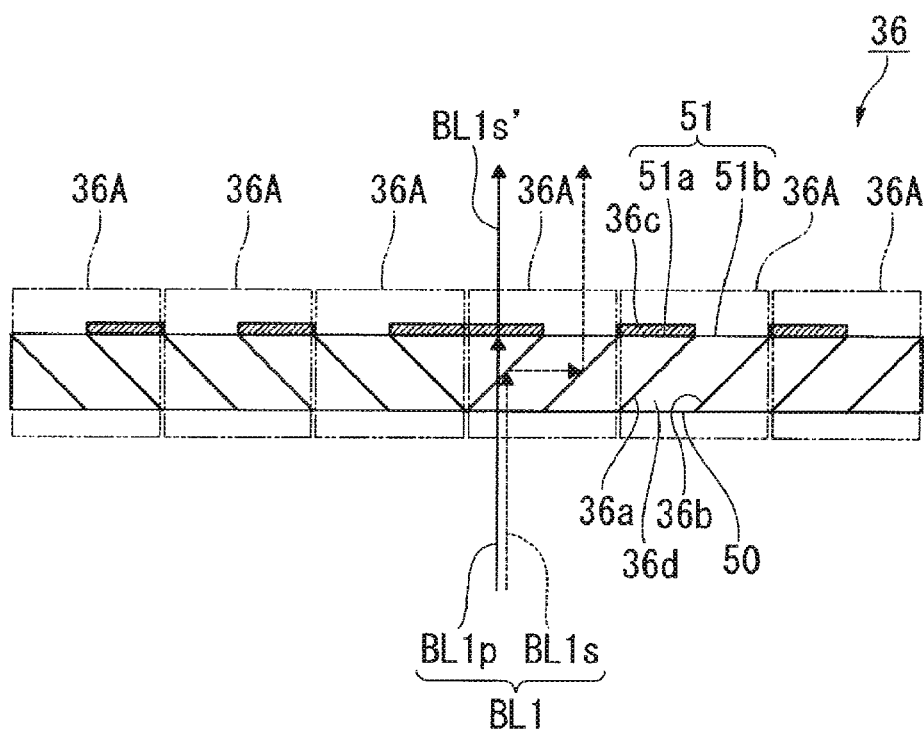
FIG. 3 shows the configuration of a key part of a polarization conversion element.

The illumination light WL having passed through the optical integration system 35 is incident on the polarization conversion element 36. FIG. 3 shows the configuration of a key part of the polarization conversion element 36.

The polarization conversion element 36 includes a plurality of polarization converter 36A, each of which is formed of a polarization separation film (polarization separation element) 36a, a reflection film 36b, a half-wave plate (second retardation element) 36c, and a light transmissive base 36d, as shown in FIG. 3. The polarization converters 36A each have a light incident surface 50 and a light exiting surface 51. The light exiting surface 51 has a first light exiting area 51a and a second light exiting area 51b. The half-wave plate 36c is provided only in the first light exiting area 51a.

In the present embodiment, each of the divided light beam fluxes from the optical integration system 35 is incident on a light incident area of the light incident surface 50 of the corresponding polarization converter 36A. The light incident area is an area that coincides with the corresponding polarization separation film 36a when viewed in the direction parallel to a normal to the light incident surface 50.

In the present embodiment, the illumination light WL contains the fluorescence YL, which is non-polarized light, and the blue light BL1, which is circularly polarized light. The fluorescence YL and the blue light BL1 therefore contain both the P-polarized component and the S-polarized component with respect to the polarization separation film 36a of each of the polarization converters 36A.

The following description will be made with reference to the blue light BL1, and the same holds true for the fluorescence YL.

Light BL1s, which is formed of the S-polarized component contained in the blue light BL1 incident on the light incident area of each of the light incident surfaces 50, is reflected off the polarization separation film 36a and the reflection film 36b and therefore exits, still in the form of S-polarized light, through the second light exiting area 51b.

Light BL1p, which is P-polarized component contained in the blue light BL1 incident on the light incident area, passes through the polarization separation film 36a, and the half-wave plate 36c provided on the first light exiting area 51a converts the P-polarized light BL1p into S-polarized light BL1s', which then exits out of the polarization converter 36A.

Since the fluorescence YL is non-polarized light, the ratio between the component reflected off each of the polarization separation films 36a and the component having passed through the polarization separation film 36a is 1. As for the blue light BL1, which is circularly polarized light, the light having exited out of each of the polarization conversion elements 36, that is, the first component contains both the component reflected off each of the polarization separation films 36a (light BL1s) and the component having passed through the polarization separation film 36a (light BL1s'). The illuminator 2 according to the present embodiment can therefore output illumination light WL that is unlikely to produce color unevenness in a projected image.

In the case where the blue light BL1 is circularly polarized light and the ratio between the intensity of the light BL1s and the intensity of the light BL1s' is 1, as in the present embodiment, the effect of reduction in color unevenness is maximized. It is noted that the ratio between the intensity of the light BL1s and the intensity of the light BL1s' is determined by the ellipticity of the polarization state of the blue light BL1.

The illumination light WL having passed through the polarization conversion element 36 enters the superimposing lens 37. The superimposing lens 37 cooperates with the optical integration system 35 to achieve a uniform illuminance distribution of the illumination light WL in an area to be illuminated.

In contrast, in the case where the diffused light from the rotating diffusive plate 42 is caused to be incident in the form of linearly polarized light on the polarization conversion element 36, as in the configuration in the related art, the diffused light undesirably exits out of only one of the first light exiting area 51a and the second light exiting area 51b of each of the polarization converters 36A. Illuminance unevenness due to the blue light therefore occurs in the area to be illuminated, resulting in color unevenness in a projected image.

According to the illuminator 2 of the present embodiment, since the circularly polarized blue light BL1 is incident on the polarization conversion element 36, illuminance unevenness due to the blue light in the area to be illuminated is reduced as compared with the illuminance unevenness in the related art. Illumination light WL that forms an image with color unevenness reduced is therefore produced. Further, since the single optical element 27 allows the reduction in illumination unevenness, an increase in the number of parts of the illuminator 2 can be suppressed.

Further, the projector 1 according to the present embodiment can display a high-quality image with color unevenness reduced.

Second Embodiment

A second embodiment of the invention will be subsequently described. The present embodiment differs from the first embodiment in terms of the configuration of the optical element in the illuminator. In the following description, the configurations and members common to those in the first embodiment have the same reference characters and will not be described or will be described in a simplified manner.

Figure 6:
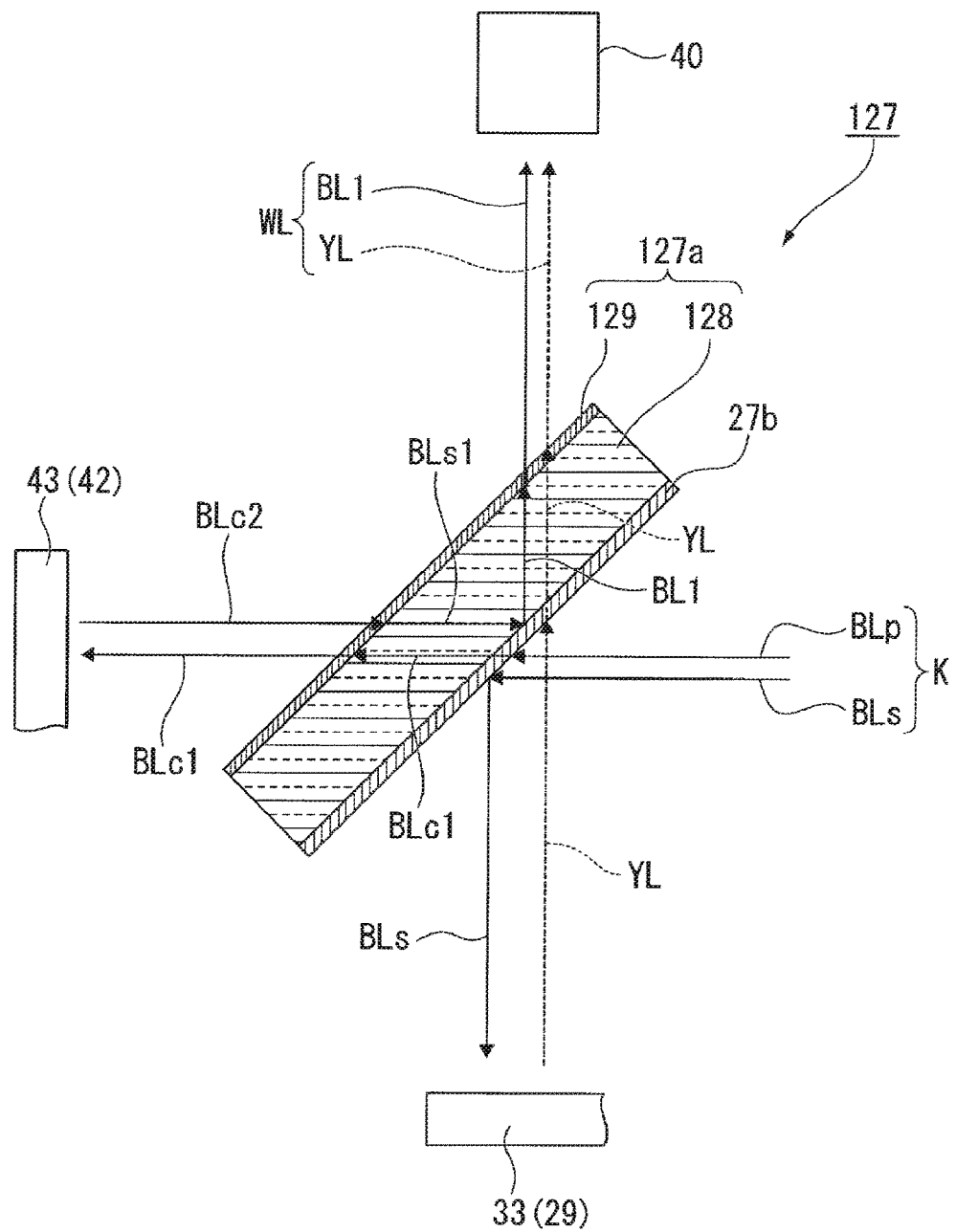
FIG. 6 is a cross-sectional view showing the configuration of a key part of an optical element in a second embodiment.

FIG. 6 shows the configuration of a key part of an optical element 127 in the present embodiment. In FIG. 6, the rotating fluorescent plate 29, the rotating diffusive plate 42, and the uniform illumination system 40 are drawn in a simplified manner.

The optical element 127 in the present embodiment has a first retardation element 127a and the dichroic film 27b, as shown in FIG. 6. The first retardation element 127a includes a transparent substrate 128 and a retardation film 129 provided on the transparent substrate 128. The transparent substrate 128 is, for example, a glass substrate. The retardation film 129 may be made of an organic or inorganic material but is preferably made of an inorganic material, which excels in heat resistance, from the viewpoint of reliability. The retardation film 129 made of an inorganic material can, for example, be an oblique evaporation film made, for example, of $SiO_2$ or $TaO_5$.

The dichroic film 27b is provided on a side of the first retardation element 127a, the side on which the light from the light source apparatus 20 is incident, and has the function of separating polarized components of the light beam flux K from each other. The S-polarized light beam BLs reflected off the dichroic film 27b is incident on the phosphor layer 33 of the rotating fluorescent plate 29 via the first pickup system 28 so that the fluorescence YL is produced, as in the first embodiment. The fluorescence YL passes through the optical element 127 and enters the uniform illumination system 40.

On the other hand, the P-polarized light beam BLp passes the dichroic film 27b and the first retardation element 127a in this order. The light beam BLp, when passing through the retardation film 129, is converted into the right-handed circularly polarized light beam BLc1. The light beam BLc1 is incident on the rotating diffusive plate 42 via the second pickup system 41. The right-handed circularly polarized light beam BLc1 is reflected off the rotating diffusive plate 42 and forms the left-handed circularly polarized blue light BLc2.

The left-handed circularly polarized blue light BLc2 is incident on the optical element 127 again. At this point, the left-handed circularly polarized blue light BLc2, when passing through the retardation film 129, is converted into the S-polarized blue light BLs1. The S-polarized blue light BLs1, when reflected off the dichroic film 27b and passing through the retardation film 129, is converted into right-handed circularly polarized light. That is, the optical element 127 outputs the right-handed circularly polarized blue light BL1.

The blue light BL1 and the fluorescence YL are combined with each other to produce white illumination light WL, which enters the uniform illumination system 40.

The present embodiment also provides the same effect as that provided by the first embodiment.

Third Embodiment

A third embodiment of the invention will be subsequently described. The present embodiment differs from the first embodiment in terms of the configuration of the illuminator. In the following description, the configurations and members common to those in the first embodiment have the same reference characters and will not be described or will be described in a simplified manner.

Figure 7:
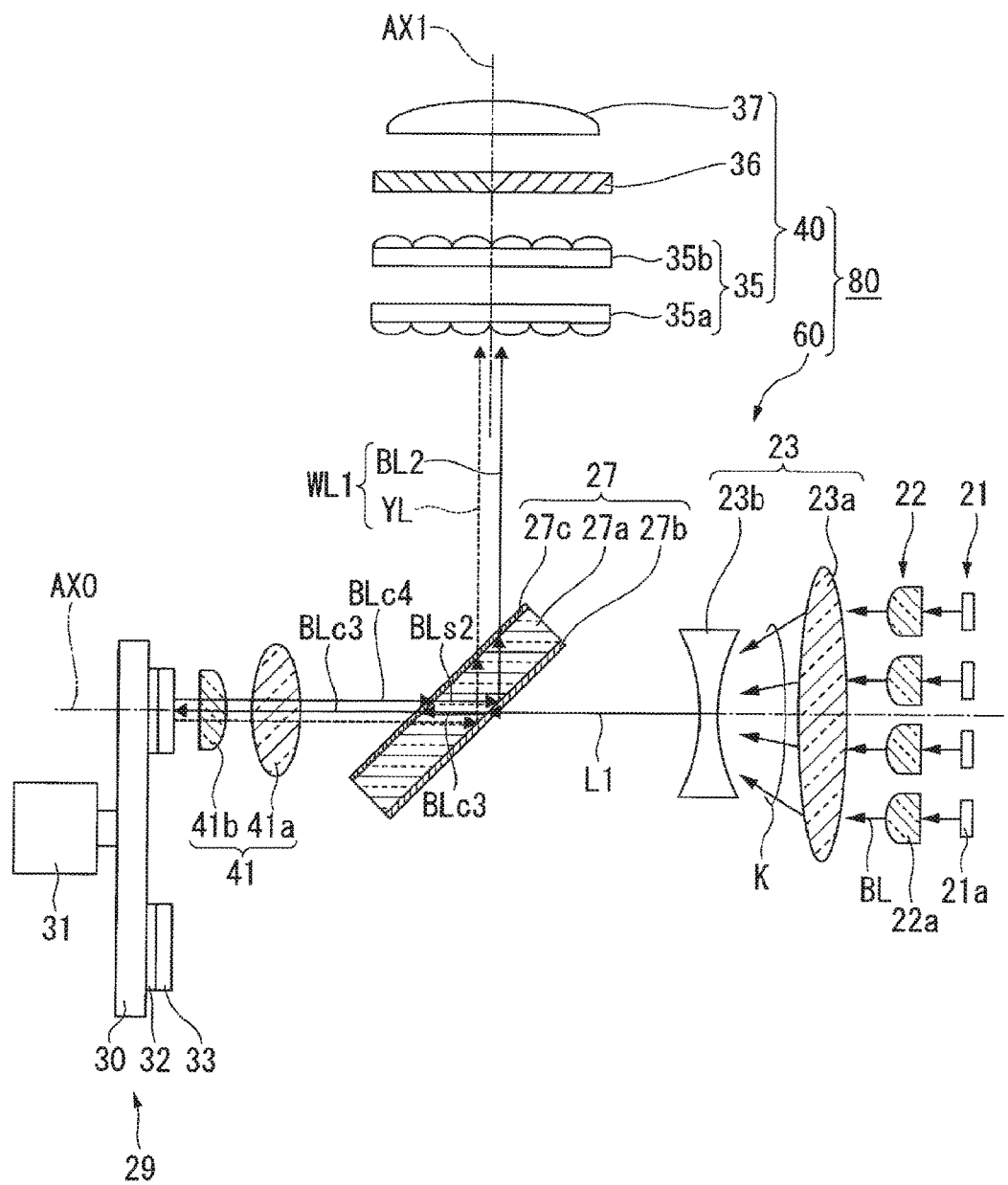
FIG. 7 shows a schematic configuration of an illuminator according to a third embodiment.

FIG. 7 shows the configuration of an illuminator 80 according to the present embodiment. The illuminator 80 includes a light source apparatus 60, the optical element 27, the pickup system 41, the rotating fluorescent plate 29, and the uniform illumination system 40, as shown in FIG. 7.

The light source apparatus 60 includes the light source unit 21, the collimator system 22, and the afocal system 23. In the present embodiment, the light source unit 21 outputs a P-polarized light beam flux K (a plurality of light beams BL) to the optical element 27.

The light beam flux K formed of the P-polarized component (hereinafter referred to as incident light L1) passes through the dichroic film 27b and the first retardation element 27a in this order.

The incident light L1, when passing through the first retardation element 27a, is converted into right-handed circularly polarized light BLc3. The light BLc3 enters the pickup system 41.

The pickup system 41 causes the light BLc3 to converge toward the phosphor layer 33 of the rotating fluorescent plate 29. The phosphor layer 33 converts part of the light BLc3 into the yellow fluorescence YL and emits it. The other part of the light BLc3 is not converted into the fluorescence YL but is reflected, in the form of left-handed circularly polarized blue light BLc4, off the rotating fluorescent plate 29 toward the optical element 27.

The blue light BLc4 can, for example, be light reflected off air holes contained in the phosphor layer 33 or light reflected off the reflection layer 32. The blue light BLc4 described above may instead be produced by providing a diffusing structure formed of minute irregularities on the surface of the phosphor layer 33 and causing part of the light BLc3 to be reflected off the diffusing structure. The blue light BLc4 corresponds to the "first component of the first light" in the appended claims. The component that forms the light BLc3 and is converted into the fluorescence YL corresponds to the "second component to be converted into the second light" in the appended claims. The air holes contained in the phosphor layer 33, the reflection layer 32, or the surface of the phosphor layer 33 corresponds to the "reflection element" in the appended claims. Employing the configuration in which the phosphor layer 33 also serves as the reflection element as described above allows reduction in the number of parts.

The blue light BLc4 is incident on the optical element 27 again via the pickup system 41. The left-handed circularly polarized blue light Blc4, when passing through the first retardation element 27a, is converted into S-polarized blue light BLs2.

The S-polarized blue light BLs2 is reflected off the dichroic film 27b, passes through the first retardation element 27a, and exits, in the form of blue light BL2, out of the optical element 27 toward the uniform illumination system 40. The blue light BL2 has been converted into right-handed circularly polarized light in the course of passage through the first retardation element 27a. That is, the blue light BL2 having exited out of the optical element 27 is right-handed circularly polarized.

The blue light BL2 and the fluorescence YL are combined with each other to produce white illumination light WL1, which enters the optical integration system 35.

The present embodiment also provides the same effect as that provided by the first embodiment.

The invention is not limited to the contents of the embodiments described above and can be changed as appropriate to the extent that the changes do not depart from the substance of the invention.

For example, in each of the embodiments described above, the first retardation element is so configured that the blue light BL1 is right-handed circularly polarized light, but not necessarily in the invention. The first retardation element may instead be so configured that the blue light BL1 is left-handed circularly polarized light. The first retardation element may still instead be so configured that the blue light BL1 is right-handed or left-handed elliptically polarized light.

The optical element 127 in the second embodiment is so configured that the dichroic film 27b and the retardation film 129 sandwich the transparent substrate 128, but not necessarily in the invention. The optical element 127 may instead be so configured that the dichroic film 27b and the transparent substrate 128 sandwich the retardation film 129. In short, the light beam BLp only needs to pass the dichroic film 27b and the retardation film 129 in this order.

Further, in the embodiments described above, a quartz substrate having an optic axis parallel to the surface of the substrate is presented by way of example of the first retardation element 27a, but not necessarily in the invention. The optic axis may incline with respect to the surface of the substrate. The polarization state of a light beam incident on the substrate at a large angle of incidence can also be changed by imparting retardation in a satisfactory manner.

Further, in the embodiments described above, the projector 1 including the three light modulators 4R, 4G, and 4B is presented by way of example. Instead, the invention is also applicable to a projector that uses a single light modulator to display a color image. The light modulators may each be a digital mirror device.

Further, the above embodiments have been each described with reference to the case where the illuminator according to any of the embodiments of the invention is incorporated in a projector, but not necessarily, and the illuminator according to any of the embodiments of the invention may be used in a lighting apparatus, a headlight of an automobile, and other apparatus. For example, in the case where the illuminator is used in a lighting apparatus, color unevenness is unlikely to occur when an illuminated object is viewed.

The entire disclosure of Japanese Patent Application No. 2016-187790, filed on Sep. 29, 2016 is expressly incorporated by reference herein.

What is claimed is:

1. An illuminator comprising:
a light source apparatus that outputs first light that belongs to a first wavelength band;
an optical element including a dichroic film having a function of separating polarized components of the first light from each other and a first retardation element and so configured that a first component of the first light outputted from the light source apparatus sequentially transmits the dichroic film and the first retardation element;
a reflection element that reflects the first component having passed through the first retardation element in such a way that the first component passes through the first retardation element and is reflected off the dichroic film;
a light dividing element provided in an optical path of the first component reflected off the dichroic film, the light dividing element including a plurality of lenses;
a polarization conversion element including a plurality of polarization converters each including a polarization separation element, a reflection film, and a second retardation element, the polarization conversion element so provided that a plurality of light beam fluxes produced by the light dividing element are incident on the corresponding polarization converters; and
a wavelength conversion element,
wherein the wavelength conversion element is configured so that a part of the first light is incident on the wavelength conversion element and is converted by the wavelength conversion element into a second light that belongs to a second wavelength band different from the first wavelength band, and the second light having exited out of the wavelength conversion element is reflected off the dichroic film and is incident on the light dividing element.

2. The illuminator according to claim 1,
wherein the wavelength conversion element also serves as the reflection element.

3. The illuminator according to claim 1,
wherein the first component is incident on the first retardation element at an angle of incidence greater than 0°, and
an optic axis of the first retardation element is parallel to a surface of the first retardation element on which the first component is incident.

4. The illuminator according to claim 1,
wherein the first retardation element includes a transparent substrate and a retardation film provided on the transparent substrate, and
the retardation film is made of an inorganic material.

5. The illuminator according to claim 1,
wherein the first retardation element is a birefringent substrate.

6. A projector comprising:
the illuminator according to claim 1;
a light modulator that modulates light from the illuminator in accordance with image information to form image light; and
a projection system that projects the image light.

7. An illuminator comprising:
a light source apparatus that outputs first light that belongs to a first wavelength band;
an optical element including a dichroic film having a function of separating polarized components of the first light from each other and a first retardation element and so configured that a first component of the first light outputted from the light source apparatus sequentially transmits the dichroic film and the first retardation element;

a reflection element that reflects the first component having passed through the first retardation element in such a way that the first component passes through the first retardation element and is reflected off the dichroic film;

a light dividing element provided in an optical path of the first component reflected off the dichroic film, the light dividing element including a plurality of lenses;

a polarization conversion element including a plurality of polarization converters each including a polarization separation element, a reflection film, and a second retardation element, the polarization conversion element so provided that a plurality of light beam fluxes produced by the light dividing element are incident on the corresponding polarization converters; and a wavelength conversion element, wherein the first light further contains a second component to be converted by the wavelength conversion element into second light that belongs to a second wavelength band different from the first wavelength band, and the wavelength conversion element is configured so that the second component is reflected off the dichroic film and is incident on the wavelength conversion element and the second light having exited out of the wavelength conversion element passes through the dichroic film and is incident on the light dividing element.

8. A projector comprising:
the illuminator according to claim 2;
a light modulator that modulates light from the illuminator in accordance with image information to form image light; and
a projection system that projects the image light.

9. A projector comprising:
the illuminator according to claim 3;
a light modulator that modulates light from the illuminator in accordance with image information to form image light; and
a projection system that projects the image light.

10. A projector comprising:
the illuminator according to claim 4;
a light modulator that modulates light from the illuminator in accordance with image information to form image light; and
a projection system that projects the image light.

11. A projector comprising:
the illuminator according to claim 5;
a light modulator that modulates light from the illuminator in accordance with image information to form image light; and
a projection system that projects the image light.

12. The illuminator according to claim 1,
wherein the optical element has a dichroic film covering a first surface of the first retardation element, the first surface being a surface that the first light is incident on, and the optical element includes an antireflection film that covers a second surface of the first retardation element, the second surface opposite the first surface.

13. The illuminator according to claim 1,
wherein the optical element is an integral piece, the dichroic film directly contacting the first retardation element.

14. A projector comprising:
the illuminator according to claim 7;
a light modulator that modulates light from the illuminator in accordance with image information to form image light; and
a projection system that projects the image light.

* * * * *